Jan. 7, 1958 H. E. TEMPLE 2,818,986
BREAD DEPANNER
Filed July 14, 1954 4 Sheets-Sheet 1
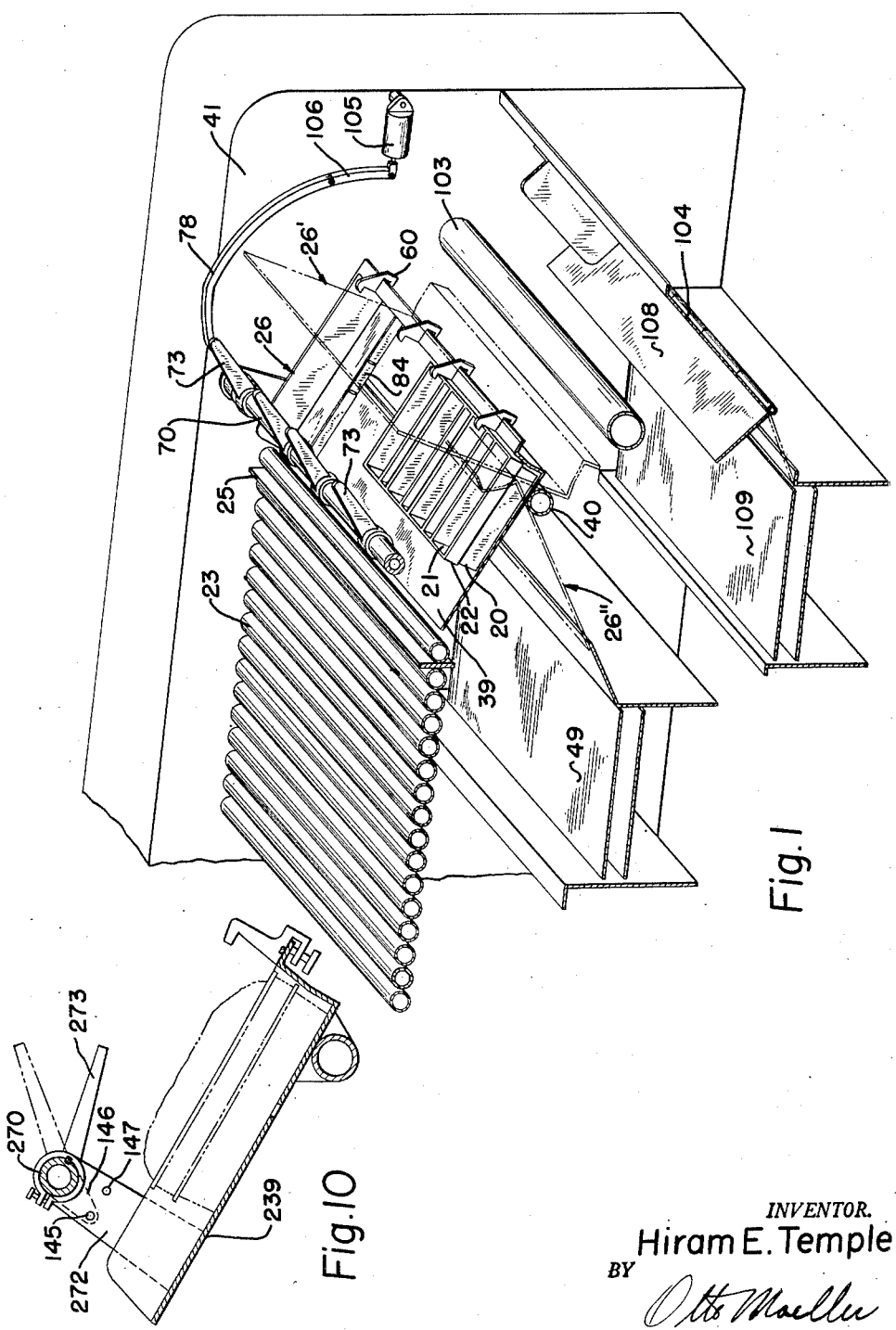
INVENTOR.
Hiram E. Temple
BY
*Otto Moeller*
Attorney Jan. 7, 1958     H. E. TEMPLE     2,818,986
BREAD DEPANNER
Filed July 14, 1954     4 Sheets-Sheet 2
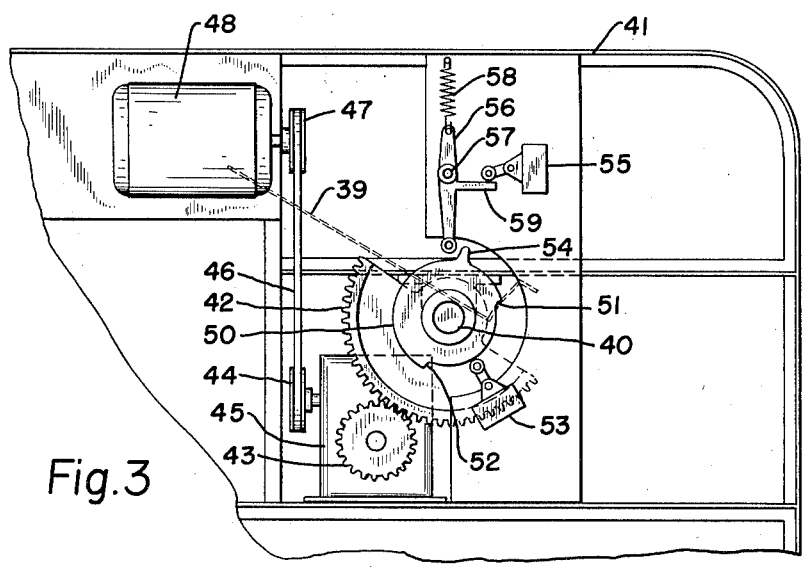
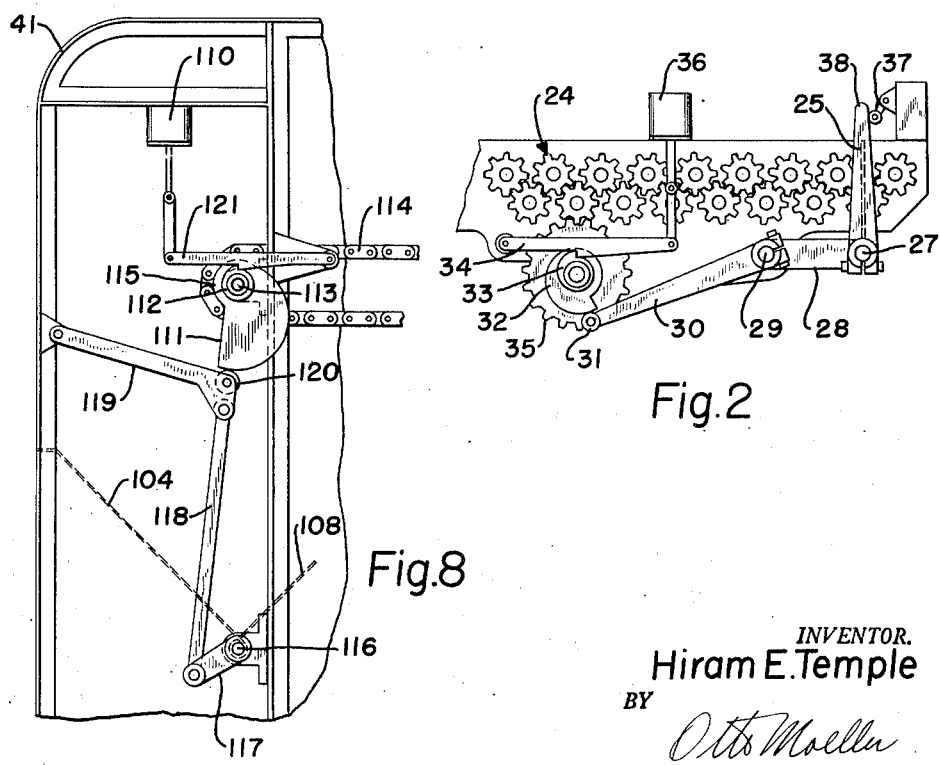
INVENTOR.
Hiram E. Temple
BY
Otto Moeller
Attorney Jan. 7, 1958 H. E. TEMPLE 2,818,986
BREAD DEPANNER
Filed July 14, 1954 4 Sheets-Sheet 3

INVENTOR.
Hiram E. Temple
BY
Otto Moeller
Attorney

Jan. 7, 1958     H. E. TEMPLE     2,818,986
BREAD DEPANNER

Filed July 14, 1954     4 Sheets-Sheet 4

INVENTOR.
Hiram E. Temple
BY
*Otto Moeller*
Attorney

United States Patent Office 2,818,986
Patented Jan. 7, 1958

2,818,986

BREAD DEPANNER

Hiram E. Temple, York, Pa., assignor, by mesne assignments, to Capitol Products Corporation, a corporation of Pennsylvania Application July 14, 1954, Serial No. 443,250

8 Claims. (Cl. 214—308)

This invention relates to means for automatically removing the contents of containers and particularly for removing loaves of bread from the pans in which they are baked.

The apparatus contemplates an oscillatory dumping structure arranged in one position to receive a row of pan straps, and being rotatable to a position for partially inverting the pan straps and dumping the loaves of bread therefrom while retaining the pan straps on the dumping structure, and being thereupon rotatable in the opposite direction for righting and removing the pan straps therefrom.

An object of the invention is to provide in such a dumping structure, novel and improved means in association with a table on which the pans are received for retaining the pans by the dumping structure when the dumping structure is rotated to partially invert the table and the pan straps, and for facilitating removal of the bread from the pan straps when so partially inverted.

Another object is to provide means automatically operative to align a plurality of pan straps on the dumping structure table in registration with a plurality of interceptor or knockout members whereby upon rotation of the dumping structure to partially invert the pan straps, they will fall away from the table to be retained by the interceptor or knockout members, the latter engaging the straps connecting the individual pans of the pan straps between adjacent loaves of bread, so that the loaves of bread released from the pans drop freely through the spaces between the interceptor or knockout members.

Another and more specific object is to provide means for automatically moving the pivotally mounted interceptor or knockout members to an extended pan retaining position as the dumping structure rotates to its partially inverted position, and to a retracted position as the dumping sructure returns to its pan receiving position, whereby in the latter position there is a minimum of interference with manual depanning and removal of a pan from the table, or with manual removal of lids from pullman bread pans.

Still another object is to provide novel means for subjecting the pan straps to a vibratory jarring impact when the dumping structure is rotated to its partially inverted position, supplementing the impact on the pans as they fall from the dumping structure table onto the interceptor or knockout members, when the dumping structure stops in its unloading position, thereby to insure loosening of any loaves tending to adhere to the pans.

Other objects and advantages of the invention will become apparent from the following description when read in connection with the accompanying drawings, in which Figure 1 is a somewhat diagrammatic sectional view in perspective showing the unloader and embodying the novel dumping structure;

Figure 2 is a fragmentary view in elevation along one side of the conveyor advancing the pans to the dumping structure and showing the gate and operating means for controlling delivery of the pans from the conveyor to the dumping structure;

Figure 3 is a fragmentary view in elevation at one side of the dumping structure showing the means controlling the oscillatory motion of the dumping structure;

Figure 8 is a fragmentary side elevation of the apparatus showing the means for controlling the operation of the bread gate;

Figure 10 is a sectional view of the rotatable table showing a modified arrangement of the interceptor bars for retaining the pans on the table when in dumping position.

Figure 4:
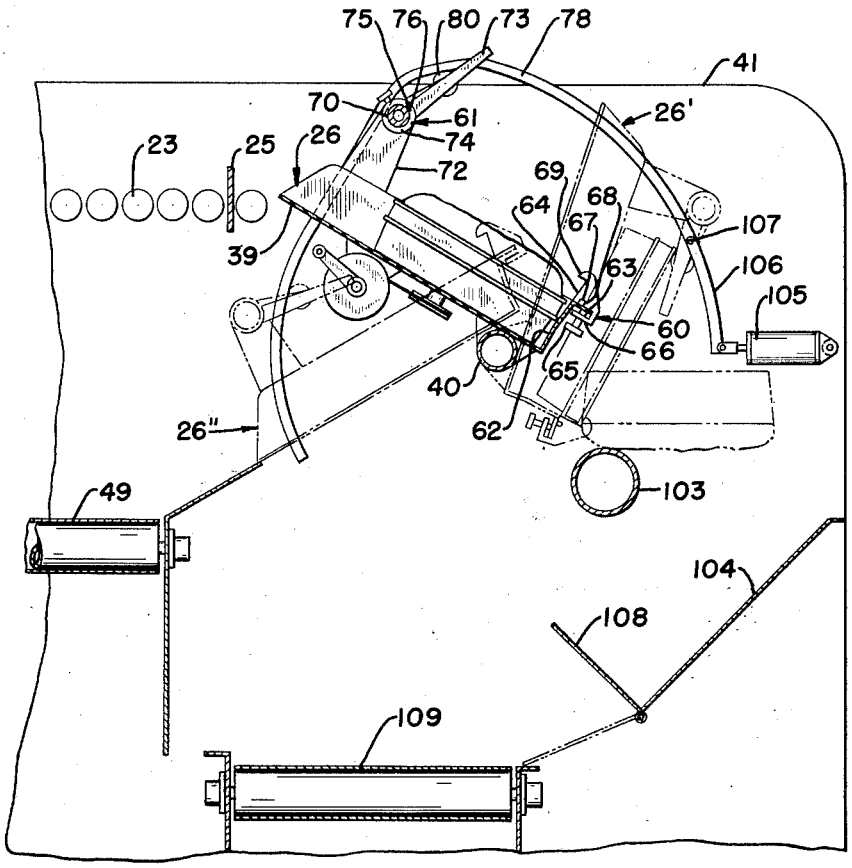
Figure 4 is a longitudinal vertical sectional view of the apparatus showing the dumping structure.

In Figure 1 of the drawings there is shown a conventional multiple pan unit 20, generally referred to as a pan strap, commonly used in bakeries for baking bread.

The pan strap 20 includes a plurality of individual pans 21, usually four in number, secured together in spaced relation by a surrounding band or strap 22.

My invention is concerned with an apparatus for extracting the baked loaves of bread from such pan straps, and particularly from a plurality of side by side pan straps 20, and it is so described herein, and as illustrated in the drawings is adapted for handling a plurality of pan straps, although in Figure 1 there is shown but one pan strap.

The pan straps 20 in which the bread is baked come from the oven, not shown, in a succession of rows with a plurality of such pan straps in each row, and are delivered in successive rows to the roller conveyor 23. Any suitable means may be provided for properly orienting and delivering the pan straps to the roller conveyor 23, and for operating the latter, as shown for example in Patent No. 2,633,258 granted on a joint application of George E. Tench and myself. Since this constitutes no part of the present invention, there is merely shown in Fig. 2, interconnected gearing 24 for operating the roller conveyor 23 from a motor (not shown) through suitable drive means (not shown).

Adjacent the forward or discharge end of the roller conveyor 23 is a gate 25 controlling the discharge of pan straps to a pan dumping structure 26, the operation of which gate is synchronized with the operation of the dumping structure as and for the purpose hereinafter described. The particular means for operating the gate 25 may conveniently be such as disclosed in the above referred to patent, though any other suitable means may be employed.

Briefly, the gate 25 is supported in an upright position by the transversely extending rod 27, the latter being carried by arms 28, one of which is shown in Figure 2. The arms 28 are rigidly secured to a rotatable shaft 29 which extends transversely of the roller conveyor 23. Also rigidly secured to the shaft 29 is an arm 30 carrying a cam follower 31 engaging a cam 32. As shown in Fig. 2, with the cam follower 31 in engagement with the high portion of the cam 32, the gate 25 is retained in extended position, i. e., in position to intercept pan straps on the roller conveyor 23.

The cam 32 is operatively connected to a single revolution clutch 33 which is normally held disengaged by a pivoted catch lever 34. The single revolution clutch 33 is operatively connected with the gear 35 which is meshed with one of the gears of the interconnected gearing 24 of the roller conveyor 23 and driven thereby. Connected to the free end of the pivoted catch lever 34 is a solenoid 36 which, when energized, swings the catch lever 34 upwardly about its pivot to permit engagement of the single revolution clutch 33, the manner in which the solenoid 36 is energized being hereinafter more particularly described.

Upon engagement of the single revolution clutch 33, the cam 32 is rotated in a clockwise direction, as viewed in Figure 2, thereby freeing the cam follower 31 from engagement with the high portion of the cam 32, permitting the gate 25 to be lowered by gravity or by spring means (not shown) out of the path of the pan straps, whereupon the pan straps will be discharged from the roller conveyor 23 to the dumping structure 26.

The solenoid 36 is energized by closing of a normally open switch 37 which is connected in series with the solenoid 36. The switch 37 is adapted to be closed by an arm 38 on the rod 27 which rod, as previously stated, also carries the gate 25. When a plurality of side by side pan straps are to be handled by the apparatus, for example four pan straps abreast, it is preferred that at least three pan straps bear against the gate 25 before the arm 38 will be deflected enough to close the switch 37. To accomplish this, suitable means (not shown) may be provided biasing the gate against deflection until a force of predetermined magnitude is applied to the gate 25 by pan straps 20 bearing thereagainst.

Thus when the proper number of pan straps bear against gate 25, then the switch 37 closes and energizes solenoid 36, whereupon single revolution clutch 33 is released to rotate cam 32 clockwise from the position as shown in Figure 2, thereby permitting retraction of gate 25 and allowing the pan straps to proceed to the dumping structure 26. This presupposes that the dumping structure 26 is in proper position to receive the pan straps. Any suitable means including switch means in series with solenoid 36 may be provided to prevent energization thereof upon closing of switch 37 except when the dumping structure 26 is in proper position to receive pan straps. Such means as shown and described in the above referred to patent may be employed, and since the particular means for accomplishing this purpose constitutes no part of the present invention, it is not shown in the drawings nor described herein.

The dumping structure 26 includes a table 39 rigidly secured to and carried by the transversely extending horizontal shaft 40 journaled in suitable bearings (not shown) carried by the framework 41 of the apparatus. Fixed on one end of the shaft 40, as shown in Figure 3, is a gear 42 meshing with a gear 43, which latter gear is driven from a pulley 44 through gearing (not shown) in a gear box 45. The pulley 44 is driven through belt 46 from an aligned pulley 47, the pulley 47 being mounted on the shaft of a reversible electric motor 48.

Through the actuating means just described and control means hereinafter described, the dumping structure 26 is operated through an operating cycle starting with the dumping structure 26 in its loading position as shown in full lines in Figures 1 and 4. In such loading position, the table 39 of the dumping structure slopes upwardly toward the delivery end of the roller conveyor 23 so that a row of pan straps discharged from the roller conveyor 23 slide downwardly and forwardly onto the table 39. From the loading position, the dumping structure 26 rotates in a clockwise direction, as viewed in Figures 1 and 4, to a partially inverted or first dumping position 26′, then rotates in a counterclockwise direction through the loading position to a downwardly sloping second dumping position 26″, and thereafter returns to the loading position completing an operating cycle. In the first dumping position 26′ loaves of bread are released from the pan straps 20, the pan straps 20 being retained by the dumping structure 26 by means hereinafter described. In the second dumping position 26″ the now empty pan straps slide off the downwardly sloping table 39 of the dumping structure onto a conveyor 49, to be carried away.

Suitable means is provided for controlling the actuation of the motor 48 to operate the dumping structure 26 through the above described operating cycle. Such means may take the form of switches in the electrical control system, as in the above referred to patent. Referring to Figure 3, there is secured on shaft 40, to which is also secured the dumping structure table 39, a cam 50. The cam 50 is provided with radial shoulders 51 and 52 disposed respectively to operate the switch 53 at the first and second dumping positions of the dumping structure 26. The cam 50 is also provided with a radial projection 54 disposed to operate the limit switch 55 at the loading position of the dumping structure on its rotation from its second dumping position. The switch 53 is a reversing switch which reverses the motor 48 and consequently the direction of rotation of the dumping structure 26 when the cam shoulders 51 and 52 engage the switch 53.

Operation of limit switch 55 by projection 54 is effected through the medium of T-shaped member 56 which is pivoted at 57 and normally retained in the position shown in Figure 3 by a spring 58. As the dumping structure 26 rotates from its second dumping position 26″ to its first dumping position 26′, the projection 54 of cam 50 engages the member 56 just as the dumping structure approaches its loading position, whereupon the arm 59 of the pivoted member 56 actuates the limit switch 55 which stops the motor 48. In causing the member 56 to actuate the limit switch 55, the projection 54 on the cam 50 moves past the member 56 to the position shown in Figure 3 and disengages the same.

Figure 5:
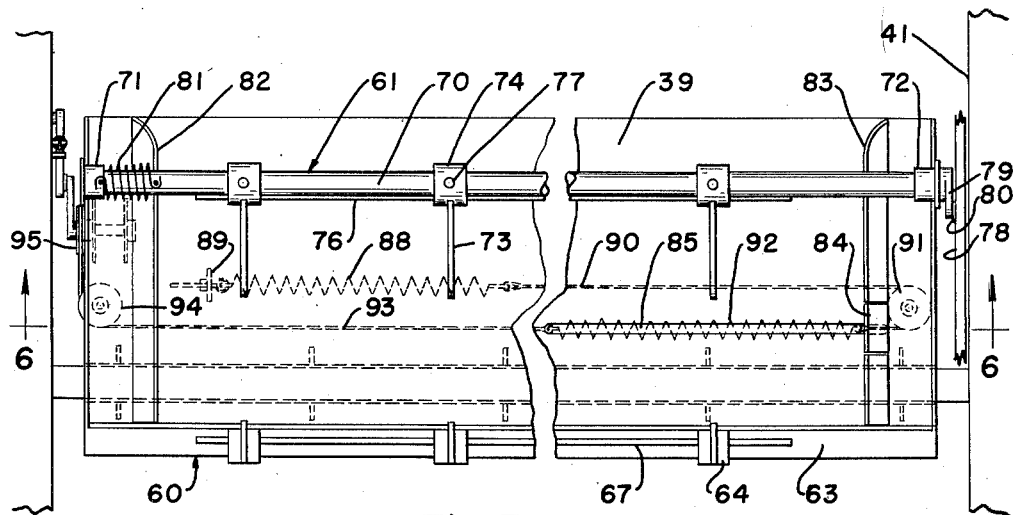
Figure 5 is a plan view of the dumping structure.

Turning now to the dumping structure 26 and particularly the means for retaining the pan straps when the dumping structure is rotated to its partially inverted or bread releasing position, it comprises an adjustable fixed retaining structure 60 and an adjustable rotary retaining structure 61, as best shown in Figures 4 and 5.

The retaining structure 60, when considered in its loading position, comprises a wall 62 at the forward end of the table 39, which wall 62 is provided at its upper edge with a forwardly extending flange or lip 63. The wall 62 acts as a stop and as means for aligning the pan straps in a straight row on the table 39 as they are received from the conveyor 23. A plurality of dogs 64 are seated on the flange 63 and are adjustably secured thereto in any suitable manner as by means of clamping screws 65 threaded through the inturned feet 66 of the dogs 64 to engage the under side of the flange 63. A transversely extending key 67 on the upper surface of the flange 63 engages corresponding grooves 68 in the dogs 64 providing guide means for laterally adjusting the dogs 64 in particular spaced relation for a purpose hereinafter to be described. The upper ends of the dogs 64 are provided with rearwardly extending lips 69 which, as shown in Figure 4, engage and retain the pan straps 20 when the dumping structure 26 is rotated to first dumping position 26′.

The adjustable rotary retaining structure 61 includes a transversely extending shaft 70 rotatably journaled in standards 71, 72 which are mounted on the table 39 adjacent the opposite rear corners thereof. Mounted to rotate with the shaft 70 and extending radially therefrom are a plurality of interceptor or knock-out bars 73. The hubs 74 of the interceptor bars 73 are provided with axially extending grooves 75 engaging with the axially extending key 76 of the shaft 70 whereby the interceptor bars 73 will rotate with the shaft 70 while being axially movable therealong. The interceptor bars 73 may thus be adjusted in particular spaced relation, for a purpose hereinafter explained, and are secured in such spaced relation by means of the set screws 77.

When the dumping structure 26 is in its loading position, as shown in Figure 4, the interceptor bars 73 are on the shaft 70 at an obtuse angle with respect to the plane of the table 39 or what may be termed the retracted position of the interceptor bars 73, whereby access may be freely had to the pan straps on the table 39 should it be necessary or desired to resort to manual depanning, or in order to remove pullman lids from the pan straps.

In order to retain the pan straps by the dumping structure 26 when it is rotated to its partially inverted first dumping position 26', it is necessary that the interceptor bars be rotated relative to the plane of the table 39 to lie in a plane approximately parallel with the said plane of the table 39, as best shown in Figure 4. To accomplish this, a cam track 78 is provided at one side of the dumping structure secured in any suitable manner to a part of the framework 41 of the apparatus. An arm 79 is fixed on the end of the shaft 70 adjacent the cam track 78 and is provided at its free end with a rotatably mounted cam follower roller 80 arranged to engage the inside of the cam track 78. To maintain the cam follower 80 in engagement with the cam track 78 thereby controlling the movement of the interceptor bars 73 as the dumping structure rotates, there is provided a torsion spring 81, one end of which is secured to the fixed standard 71 and the other end of which is secured to the rotatable shaft 70.

As previously brought out, the dogs 64 are laterally adjustable, as are the interceptor bars 73. The reason for this is to permit locating them so that when the dumping structure 26 is rotated to its dumping position 26', the pan straps 20 will fall away from the table 39, landing on and being retained by the dogs 64 and interceptor bars 73 with the said dogs and interceptor bars engaging the bands or straps 22 of the pan straps 20 between the individual spaced pans 21 thereof. In other words the dogs 64 and interceptor bars 73 engage the pan straps 20 between the bread loaves in the spaced individual pans 21, so that the released loaves of bread can fall freely by gravity between the dogs 64 and interceptor bars 73. To accomplish this, there must be a definite relation between the positioning of the pan straps 20 on the table 39 and the location of the dogs 64 and interceptor bars 73, and the means for properly positioning the successive rows of pan straps 20 on the table 39 will now be described.

Figure 6:
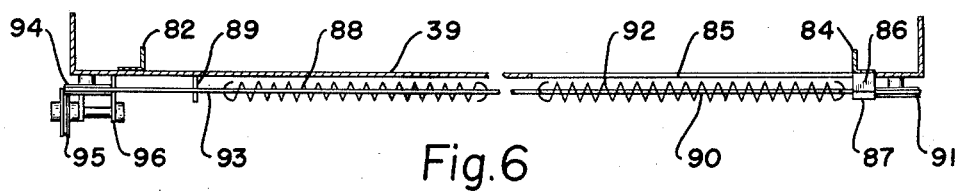
Figure 6 is a sectional view taken on the line 6—6 of Figure 5.

On the table 39 adjacent one side thereof and extending substantially from the rear to the forward end thereof is a fixed upright wall forming a pan guide and stop 82. Adjacent the opposite side of the table 39 is a similar pan guide 83 having an intermediate movable portion 84 constituting a pan strap pusher. The table 39 is provided with a slot 85 extending transversely and partially across the table 39 from the pusher portion 84 of the pan guide 83, as best shown in Figures 5 and 6. Depending from the pan strap pusher 84 is a lug 86 which extends through and projects downwardly beyond the slot 85 whereby movement of the pusher 84 is guided and constrained in a transverse direction across the table 39. Secured to the bottom of the lug 86 by suitable means (not shown) is a separable plate-like member 87 forming with the lug 86 a clamping means for a purpose to be described.

The movable pusher 84 is normally retained in its retracted position in alignment with the guide 83, as shown in Figure 5, by means of a light tension spring 88, one end of which is attached to a bracket 89 on the under side of the table 39 adjacent the pan stop 82. The other end of the spring 88 is attached to one end of a cable 90 which extends around a pulley 91 mounted on the under side of the table 39 adjacent the pan guide 83, the other end of cable 90 being secured to the pusher 84 by the clamping means 86, 87.

The pan straps 20 delivered onto the table 39 are in lateral spaced relation since that is the manner in which they pass through the oven, and the location of the pan straps of successive rows on the table 39 will vary somewhat. The pusher 84 is therefor provided to push the pan straps of successive rows together and against the pan stop 82. Thus, the pans being uniform in transverse cross section, though not necessarily in length, it is apparent that interceptor bars 73 and the dogs 64 can be fixed in adjusted position to engage the pan straps of successive rows on the straps thereof between adjacent individual pans.

Figure 7:
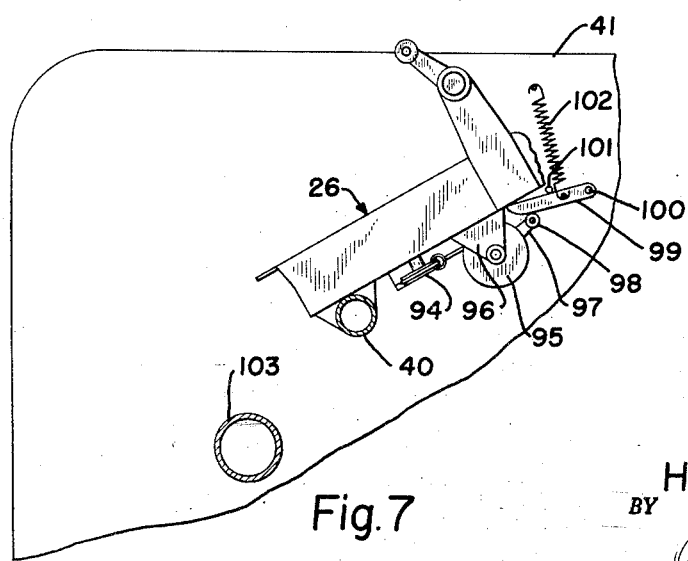
Figure 7 is a view in side elevation of the dumping structure.

The means for moving the pusher 84 to extended position to shove the pan straps together and against the pan stop 82 includes a spring 92 which when under tension is capable of overcoming the spring 88, the latter spring as previously stated, normally retaining the pusher 84 in retracted position. The spring 92 is secured at one end with the pusher 84 in any suitable manner, as by attaching it to an end of cable 90 projecting from the clamping means 86, 87, of the pusher 84. The other end of spring 92 is attached to one end of a cable 93 which extends around a pulley 94 mounted on the under side of the table 39 adjacent the pan stop 82, the other end of cable 93 being secured to the periphery of another pulley 95. The pulley 95 is mounted in a bracket 96 attached to the under side of the table 39 adjacent the same lateral side thereof as the pulley 94 and rearwardly thereof as shown in Figures 4 to 7, the axis of pulley 95 being perpendicular with respect to the axis of pulley 94. Referring particularly to Figures 5 and 7, the pulley 95 is provided with a radially projecting arm 97 having at its free end a cam follower roller 98 arranged to engage the free end portion of a lever 99 pivoted at 100 to an inner side wall portion of the framework 41 of the apparatus. The pivoted lever 99 is normally held against a stop member 101, also secured to the framework 41, by a spring 102 one end of which is attached to the lever 99 and the other end of which is attached to the framework 41.

In operation, as the dumping structure 26 rotates about the axis of shaft 40 from its loading position toward its first dumping position 26', the cam roller 98 bearing against the lever 99 causes the pulley 95 to rotate in a clockwise direction, as viewed in Figure 7, thereby winding the cable 93 on the pulley 95. The spring 88, being lighter than spring 92, will yield whereby the pusher 84 is pulled across the table 39 along the slot 85 to move the pan straps solidly against the stop 82. Now, if there is a full row of pan straps on the table 39 or if the size of the pan straps is such that they are moved solidly against the stop 82 before the cam follower 98 rides off the end of the lever 99, further winding up of cable 93 on the pulley 95 is provided for by the yielding of spring 92. Thus, the apparatus provides for the pan straps being moved solidly against the stop 82, even though there may be less than a full row of pan straps on the table 39 and also for slight differences in the width of the pan straps or pan straps that through usage have been somewhat deformed. The apparatus further provides for runs of different size pan straps, merely by adjusting the dogs 64 and interceptor bars 73. In all cases the pan straps will be pushed solidly against the stop 82 and the pan straps of successive rows will be uniformly located on the table 39 so that the dogs 64 and interceptor bars 73, once adjusted, will always engage the straps 22 of the pan straps 20 between the individual pans 21.

As previously stated, the cam follower 98 rides off the end of the lever 99, and these parts are so dimensioned that this will occur just prior to the dumping structure reaching its first dumping position 26'. Upon release of the cam follower 98 from the lever 99, the spring 88 will return the pusher 84 from its extended to its normally retracted position. On the return of the dumping structure from its first dumping position 26', the cam follower 98 depresses the hinged lever 99 thereby passing by it and permitting the spring 102 to return the lever 99 against the stop member 101.

When the dumping structure 26 stops in its dumping position 26' upon reversal of the motor 48, as previously described, the impact of the pan straps 20 against the interceptor bars 73 and dogs 64 as they fall from the table 39, accentuated by the momentum transmitted to the pan straps by rotation of the dumping structure, causes the loaves of bread to be loosened from the pans 21 and to drop freely between the interceptor bars 73 and dogs 64. A bread inverter bar 103 extends transversely of the apparatus subjacent the dumping structure 26, being so positioned as to intercept the rearward end portions of the falling inverted loaves. The unintercepted longer portions of the loaves continue falling and the momentum thereof causes the loaves to be turned over and deposited in right side up row on the downwardly sloping receiver shelf 104.

In order to insure loosening of the loaves from the pans 21 in the dumping position 26' it is desirable to provide an electrically or otherwise operated vibrator 105. The vibrator 105 is preferably a simple, small, alternating current vibrator of well known construction, and the details thereof are consequently not shown. The vibrator 105 is operatively connected to the free end of an extension 106 of the cam track 78, the cam track 78 and cam track extension 106 being pivotally connected as at 107. When the dumping structure reaches its dumping position 26', as best shown in Figure 4, the cam follower 80 engages the hinged cam track extension 106, the vibration of the latter being transmitted to the dumping structure through the cam follower 80, the arm 79 which carries the cam follower 80, and the shaft 70 to which is secured both the arm 79 and the dumping structure 26. Suitable switch means, not shown, may be provided in the electric circuit to the vibrator 105, for operating the latter when the dumping structure is in its dumping position 26'. The rapid vibration of the dumping structure jars loose any loaves having a tendency to stick in the pans, thereby assuring release of all the loaves from the pans.

As before stated, the released loaves of bread are deposited right side up on the downwardly sloping receiver shelf 104. The loaves slide down the shelf 104 and are momentarily stopped thereon by a gate 108 thereby aligning the loaves in a straight row. The gate 108 is rotatably mounted adjacent the lower edge of the shelf 104 forming therewith when in loaf stopping position a V-shaped trough, as best shown in Figures 1, 4 and 8. At the proper moment, as hereinafter described, the gate 108 rotates in counterclockwise direction, as viewed in Figure 4, to a downwardly sloping position whereby the row of loaves is released from the shelf 104 and slides across the gate 108 onto the transversely extending bread take away conveyor 109.

The operation of the bread gate 108 is controlled by a solenoid 110 through means hereinafter described. The solenoid 110 is energized concurrently with solenoid 36, which as before described controls operation of the pan gate 25, to effect opening and closing of the bread gate 108 to discharge a previously dumped row of loaves from the bread shelf 104 to the bread take away conveyor 109 at the same time that another row of pan straps are delivered to the dumping structure 26.

Turning now to the means for operating the bread gate 108, with particular reference to Figure 8, a cam 111 is connected to a single revolution clutch 112 which is carried by a shaft 113 mounted on the framework 41 of the apparatus. The clutch 112 is adapted to be driven by a chain 114 which is trained over a sprocket 115 connected to the clutch 112, and which chain is driven through suitable drive connections (not shown) from the same motor (not shown) from which is driven the interconnected gearing 24. Fixed on one end of the shaft 116 of the bread gate 108 is an arm 117 to which is pivotally connected one end of a connecting rod 118.

The opposite end of connecting rod 118 is pivotally connected to a bracing rod 119 which in turn is pivotally connected to the frame 41. A cam follower 120 carried by the bracing arm 119 adjacent its pivotal connection with connecting rod 118 engages the cam 111. When the solenoid 110 is energized, as before described, it lifts a pivoted catch 121, whereupon clutch 112 is engaged to rotate the cam 111 through one revolution. As the cam 111 rotates, counterclockwise as viewed in Figure 8, the cam follower 120 rides off the cam 111 whereupon the gate 108 by its own weight, or by biasing means not shown, drops pivotally about the axis of shaft 116 to its open position. As the cam 111 completes its single revolution it will again raise the bread gate 108 to closed position by depressing cam follower 120.

Figure 9:
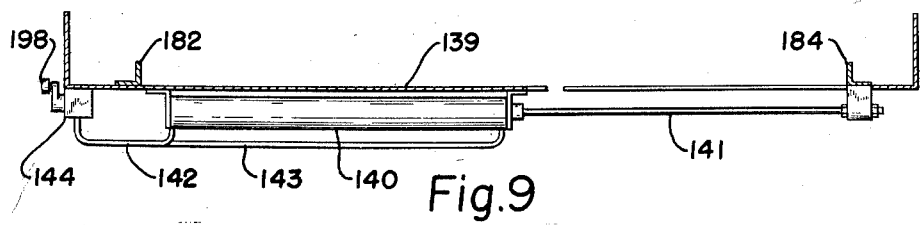
Figure 9 is a sectional view similar to Figure 6 showing a modification of the pan strap compacting means.

Referring to Figure 9, the table 139 is the same as table 39 previously described, there being here shown a modification of the means for compacting and locating the pan straps on the table. In the modified form of the invention a fluid-pressure cylinder 140 is employed to operate the pusher 184 instead of the spring means previously described that operate the pusher 84 of the first form of the invention. The piston rod 141 of the fluid-pressure cylinder is connected with the pusher 184 for moving it toward and away from the fixed stop 182 for properly locating the pan straps on the table 139, as explained in the above description of the first form of the invention.

Pressure fluid supply lines 142 and 143 lead to opposite ends of the cylinder 140 and suitable valve means 144 controls the flow of pressure fluid through the lines 142 and 143. The valve means 144 is normaly biased to deliver pressure fluid through line 142 to retain the pusher 184 in its normal position, as shown in Figure 9. The valve means is actuated by means of the cam roller 198, to change the flow of pressure fluid to the cylinder 140, for an instant just as the table 139 moves from its pan loading position to its first dumping position. The same mechanism, such as lever 99 of the first form of the invention, particularly shown in Figure 7 and described above, may be employed for actuating the cam roller 198.

Referring to Figure 10, the table 239 is the same as table 39 of the first form of the invention and functions in the same manner. In this modified form of the invention, however, the interceptor bars 273 are not moved by the cam track arrangement as previously described. They are normally maintained in the full line position of Figure 10 by means of a pin 145 extending through openings in the standard 272 and the arm 146 which is secured in suitable manner to the shaft 270 carrying the interceptor bars 273. The interceptor bars 273 may be moved to the position shown in dot and dash lines in Figure 10 and retained there by inserting the pin 145 through the opening in the arm 146 and a second opening 147 in the standard 272. The interceptor bars 273 may thus be moved and held out of the way should it be necessary or desired to resort to hand depanning.

I claim as my invention:

1. In a device for removing bread loaves from baking pans, a dumping structure having a table for supporting a row of pan straps, a fixed pan stop on said table adjacent one side thereof, a pusher member carried by said table on the opposite side thereof, means for moving said pusher member toward said pan stop for pushing the row of pan straps solidly thereagainst to locate the pan straps in predetermined position on said table, means for rotating said dumping structure for at least partially inverting said positioned row of pan straps, and pan strap arresting means supported by said dumping structure for rotation therewith as said dumping structure rotates to said position for at least partially inverting said positioned row of pan straps, said pan strap arresting means including a shaft adjacent the rearward end of said table supported at its ends on the ends of said dumping structure in parallel spaced relation with respect to the pan strap supporting surface of said table to provide therebetween an opening through which pan straps are delivered to said table, and including interceptor bars mounted on said shaft and extending forwardly therefrom toward the forward end of said table, said interceptor bars being laterally spaced with respect to each other to receive and engage top portions of said pan straps between adjacent loaves of bread upon said inversion of said dumping structure to arrest the pan straps while permitting the loaves of bread to drop from said pan straps between said interceptor bars.

2. In a device for removing bread loaves from baking pans, a dumping structure having a table for supporting a row of pan straps, means for rotating said dumping structure for at least partially inverting said row of pan straps, a fixed pan stop on said table adjacent one side thereof, a pusher member carried by said table on the other side thereof, means actuated by rotation of said dumping structure for moving said pusher member toward said pan stop for pushing the row of pan straps solidly thereagainst to locate the pan straps in predetermined position on said table, and means adapted to receive and engage top portions of said pan straps between adjacent loaves of bread during the inverting movement to arrest the pan straps and jar the bread from the pans.

3. In a device for removing bread loaves from baking pans, a dumping structure for supporting a row of pan straps, means for compacting said row of pan straps on said dumping structure, means for rotating said dumping structure for at least partially inverting said pan straps, actuating means for moving said compacting means between a retracted position to receive pan straps and an extended position to compact said pan straps, said actuating means normally urging said compacting means to retracted position, and control means responsive to partial rotation of said dumping structure from its pan receiving position to effect operation of said actuating means to move said compacting means to extended position and responsive to further rotation of said dumping structure to effect operation of said actuating means to move said compacting means to retracted position.

4. In a device for removing bread loaves from a plurality of spaced pans connected to form a pan strap, a dumping structure having a table for supporting pan straps, means for oscillatably rotating said dumping structure about a horizontal axis between a pan strap supporting position and a position for at least partially inverting said pan straps, pan strap arresting means carried by said dumping structure for rotation therewith as said dumping structure rotates to said position for at least partially inverting said pan straps, said pan strap arresting means including a shaft adjacent the rearward edge of said table supported at its ends on the ends of said dumping structure in parallel spaced relation with respect to the pan strap supporting surface to said table to provide therebetween an opening through which pan straps are delivered to said table, and said pan strap arresting means also including interceptor bars mounted on said shaft and extending forwardly therefrom toward the forward edge of said table in spaced relation with respect to the plane of said table, said interceptor bars being laterally spaced with respect to each other to receive and engage top portions of said pan straps between adjacent loaves of bread upon said inversion of said dumping structure to retain the pan straps while permitting the loaves of bread to drop from said pan straps between said interceptor bars, said interceptor bars constituting means for retention of said empty pan straps by said dumping structure as said dumping structure rotates from said at least partially inverted position.

5. A device as defined in claim 4 wherein said interceptor bars upon inversion of said dumping structure are substantially parallel with respect to the plane of said table and are spaced therefrom a distance greater than the height of a pan strap carried by the dumping structure whereby in said inverted position the pan strap is adapted to fall away from said table onto said interceptor bars and jar the bread from the pan strap.

6. A device as defined in claim 4 wherein said interceptor bars are pivotally movable about the axis of said shaft in a direction away from the plane of said table to provide an opening between the free ends of said interceptor bars and the forward edge of said table when said table is in its pan strap supporting position, through which opening a pan strap is manually removable from the dumping structure.

7. In a device for removing bread loaves from baking pans, a dumping structure having a table for supporting a row of pan straps, pan arresting means including elements pivotally mounted on said dumping structure in spaced relation with respect to the plane of said table, said elements being pivotally movable about said pivotal mounting between an extended position over and substantially parallel with respect to the plane of said table and a retracted position more remote from the plane of said table, means for rotating said dumping structure for at least partially inverting said row of pan straps, actuating means responsive to rotation of said dumping structure toward its pan strap inverting position for moving said elements to extended position for arresting the inverted pan straps and responsive to rotation of said dumping structure in the opposite direction for moving said elements to retracted position, said actuating means including cooperating cam elements carried by said rotating dumping structure and a stationary part of the device.

8. In a device for removing bread loaves from baking pans, a dumping structure having a table for supporting a row of pan straps, pan arresting means including elements pivotally mounted on said dumping structure in spaced relation with respect to the plane of said table, said elements being pivotally movable about said pivotal mounting between an extended position over and substantially parallel with respect to the plane of said table and a retracted position more remote from the plane of said table, means for rotating said dumping structure for at least partially inverting said row of pan straps, actuating means responsive to rotation of said dumping structure toward its pan strap inverting position for moving said elements to extended position for arresting the inverted pan straps and responsive to rotation of said dumping structure in the opposite direction for moving said elements to retracted position, said actuating means including a cam follower carried by and movable with said dumping structure and a cam track carried by a stationary part of the device engaged by said cam follower, a portion of said cam track engaged by said cam follower when said dumping structure is in said partially inverted position being pivotally mounted and which device includes means for vibrating said pivotally mounted cam track portion whereby to jar said pan straps to free the bread therefrom.

References Cited in the file of this patent

UNITED STATES PATENTS

| | | |
|---|---|---|
| 2,633,258 | Temple et al. | Mar. 31, 1953 |
| 2,682,961 | Winfree et al. | July 6, 1954 |

FOREIGN PATENTS

| | | |
|---|---|---|
| 681,605 | Great Britain | Oct. 29, 1952 |